United States Patent [19]
Harris

[11] Patent Number: 4,651,925
[45] Date of Patent: Mar. 24, 1987

[54] ROTARY SPRAY DEVICE

[75] Inventor: Larry W. Harris, Howard, Ohio

[73] Assignee: Washtronics, Inc., Greentown, Ohio

[21] Appl. No.: 744,471

[22] Filed: Jun. 13, 1985

[51] Int. Cl.[4] .......................... B05B 3/16; B05B 3/02
[52] U.S. Cl. .................................. 239/239; 239/264; 91/323; 91/344
[58] Field of Search ............... 239/237, 239, 263, 264, 239/224, 273, 275; 91/323, 344, 350; 137/625.26, 596, 596.1

[56] References Cited

U.S. PATENT DOCUMENTS

| 853,774 | 5/1907 | Davies | 91/344 X |
| 1,051,601 | 1/1913 | Laursen | 91/344 X |
| 1,111,734 | 9/1914 | Campbell | 239/239 |
| 1,317,540 | 9/1919 | Bavor | 239/275 |
| 1,755,455 | 4/1930 | Nelson | 239/239 |
| 2,477,237 | 7/1949 | Carr | 137/596.1 |
| 2,837,148 | 6/1958 | Jay | 137/625.26 |
| 3,625,425 | 12/1971 | Robinson | 239/239 X |
| 3,779,132 | 12/1973 | Otto | 91/350 X |

FOREIGN PATENT DOCUMENTS 660119  10/1951  United Kingdom ................ 239/239

Primary Examiner—Joseph F. Peters, Jr.
Assistant Examiner—Kevin Patrick Weldon
Attorney, Agent, or Firm—Sand & Hudak Co.

[57] ABSTRACT

A spray device having a plurality of rotating nozzles directing sprays of a high pressure fluid in a circular pattern against an object being cleaned. The nozzles are mounted on the ends of supply pipes extending radially outwardly from a hub connected to a hollow crankshaft. The crankshaft is connected to a source of high pressure fluid through a supply conduit which is connected to the crankshaft by a rotary union. The rod of a double action piston is connected to the crankshaft and rotates the crankshaft and nozzles upon linear reciprocating movement of the piston rod. The piston cylinder is pivotally mounted on a valve block which has a pair of ball check valves which are actuated by a rocker bar mounted on the cylinder. A small quantity of the high pressure fluid is directed into the valve block from a manifold and is injected alternatively into the ports of the cylinder upon pivotal movement of the cylinder to reciprocate the rod and rotate the crankshaft and connected spray nozzles. The small quantity of diverted high pressure fluid supplies all of the power required to rotate the nozzles eliminating the need for any external power source and without materially detracting from the supply of fluid to the nozzles.

15 Claims, 12 Drawing Figures

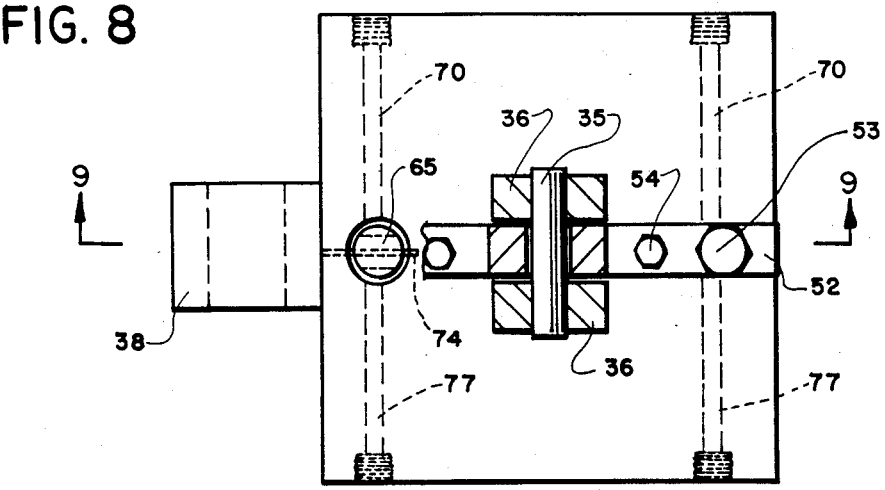
FIG. 8
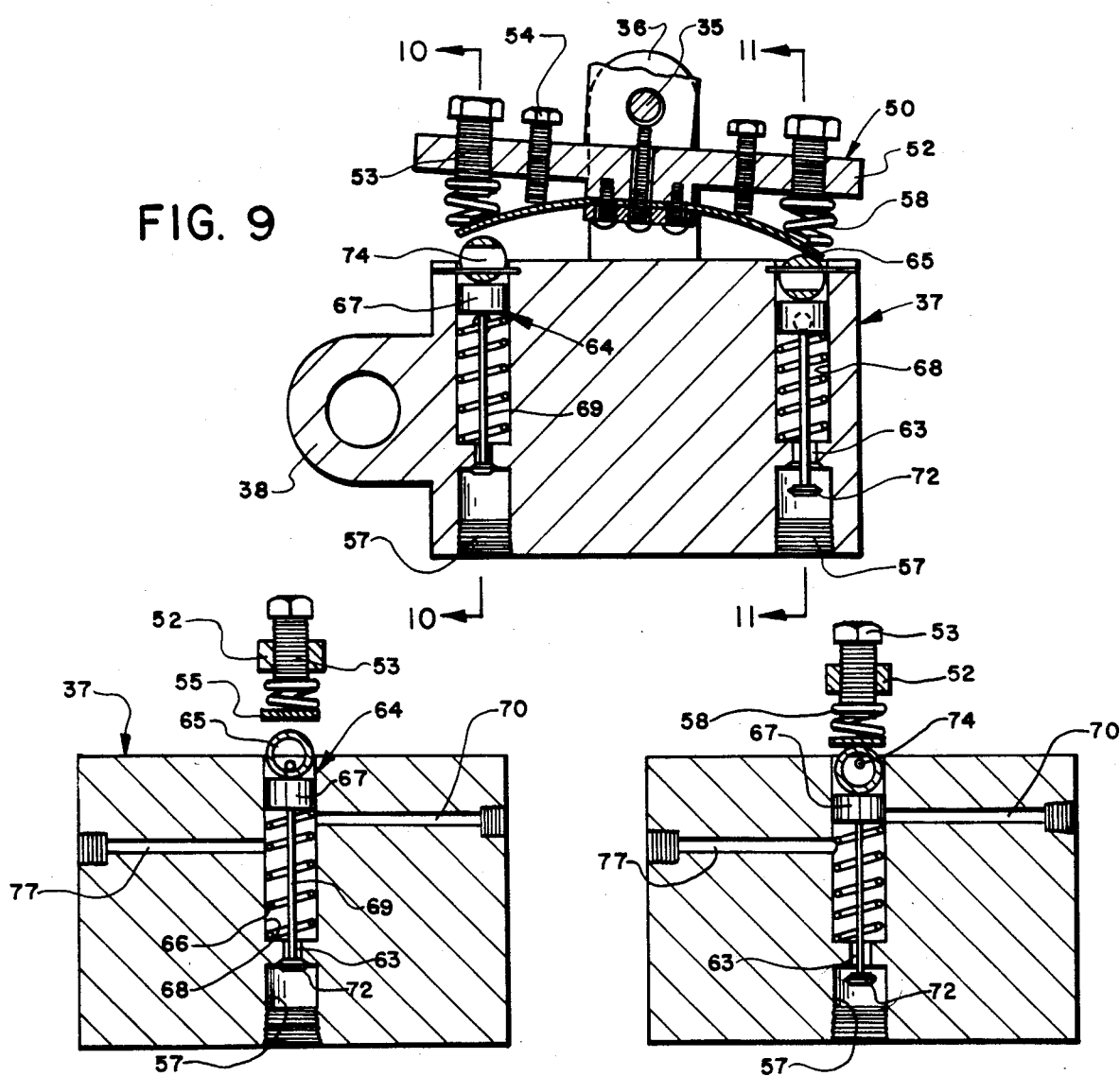
FIG. 9
FIG. 10
FIG. 11

ROTARY SPRAY DEVICE

TECHNICAL FIELD

The invention relates to devices for spraying high pressure liquid onto a vehicle in a car wash installation and particularly to a device containing a plurality of rotating spray nozzles. More particularly, the invention relates to such a rotary spray device in which the power for rotating the nozzles is supplied by using a small quantity of the high pressure spray liquid.

BACKGROUND ART

Various types, styles and arrangements of spray nozzles are used in vehicle washing installations for supplying a high pressure water spray containing various chemical compounds against parts of the vehicle to clean the vehicle as it moves past the nozzles or the nozzles are moved with respect to the vehicle. These spray nozzles may be fixed and directed in a predetermined direction for spraying specific generally constant surfaces of a vehicle such as the sides, hoods or roofs of the vehicle and achieve a generally satisfactory result. However, areas of certain vehicles such as the rocker panel, wheels and other irregular surfaces are difficult to clean satisfactory by a fixed nozzle and spray pattern due to the different angles and surface configurations of such rocker panels and wheel for the various vehicles processed in a car wash installation.

One method and device for efficiently cleaning these irregular vehicle surfaces is to use a movable nozzle such as an oscillator or rotary nozzle. These nozzles will increase the area covered by the spray and will reach the irregular surfaces and effectively clean the same. Prior rotary nozzles consist of a plurality of spray nozzles directed at various angles toward the vehicle surface which are rotated by an air motor, electric motor, hydraulic motor, or the like. The use of such motors for supplying the rotary power to the nozzles require additional components and control equipment, such as electric or pneumatic solenoids, a supply of electricity or compressed air and control valves therefor. All of these components increase the cost of the spray nozzle as well as increased maintenance due to the harsh environment to which these additional components are subjected, and increased operating cost.

Other spray devices have used the high pressure liquid that is sprayed from the nozzles for rotating the nozzles. However, these prior devices require that the nozzles be directed at an angle with respect to the surface being cleaned and at an angle to the axis of the shaft on which the nozzles are rotated in order to supply the resultant force component necessary to rotate the nozzles about the shaft. These devices use a large portion of the force of the liquid sprayed from the nozzles for rotating the nozzles instead of directing the entire force of the sprayed liquid against the surface being cleaned. Thus, the cleaning efficiency of the nozzle is reduced by reducing the pressure exerted by the liquid against the vehicle since a large portion of the liquid pressure is used for rotating the nozzles.

Therefore the need has existed for a rotary spray device which is self-powered by use of only a very small amount of the high pressure liquid that is sprayed from the nozzle. There is no known rotary spray device of which I am aware which accomplishes this result other than my invention described in detail below.

DISCLOSURE OF THE INVENTION

Objectives of the invention include providing an improved rotary spray device for spraying high pressure liquid onto a vehicle in which the power for rotating the spray nozzles is derived from an extremely small amount of the high pressure spray liquid thereby eliminating the need of any auxillary drive motor for the nozzles such as air, electric, hydraulic or the like heretofore used for prior rotary nozzles. Another objective is to provide such an improved spray device in which the spray angle is generally perpendicularly against the surface being cleaned whereby nearly all of the spray force is used for cleaning and not for rotating the spray nozzles; and in which the spray nozzles are mounted on the ends of radially extending arms that are mounted on a liquid supply shaft which is rotated by the reciprocal motion of a piston rod connected to the shaft by an eccentric mechanism.

A still further objective of the invention is to provide such an improved rotary spray device in which the drive piston is reciprocally mounted within a cylinder which is pivoted through a limited arc upon rotation of the eccentric mechanism whereby a control bar associated with the cylinder alternately opens and closes a pair of check valves for admitting a small portion of the high pressure spray liquid into the cylinder for reciprocating the piston rod within the cylinder to rotate the nozzle shaft. Another objective is to provide such a spray device in which the nozzles are mounted in a predetermined position adjacent a vehicle to be cleaned thereby; in which adjusting means regulate the position of the nozzles with respect to a mounting bracket; and in which the check valves are controlled by spring biased check valve balls actuated by the ends of a pivotally mounted lever or rocker bar controlled by the pivotal movement of the cylinder.

A still further objective of the invention is to provide such an improved rotary spray device which is rugged and durable in use, which uses a readily available double-action piston as one of its main components for providing a reciprocating linear motion which is transmitted into the rotary motion of the spray nozzles through an eccentric mechanism; and in which the spray device achieves the stated objectives in a simple and efficient manner completely free of any external power for rotating the nozzles except for a small amount of high pressure spray liquid.

These objectives and advantages are obtained by the improved rotary spray device of the invention, the general nature of which may be stated as a device for spraying high pressure liquid onto a vehicle including nozzle means for spraying a fluid in a generally perpendicular direction against a surface to be cleaned; conduit means adapted to be connected to a source of high pressure fluid for supplying the fluid to the nozzle means; eccentric means connected to the nozzles means for rotating said nozzle means upon rotation of said eccentric means; piston means having a piston rod connected to the eccentric means for rotating the eccentric means upon linear movement of the piston rod; and valve means communicating with the piston means and source of high pressure fluid for selectively introducing a quantity of the high pressure fluid into the piston means to reciprocate the piston rod and rotate the nozzle means through the eccentric means.

BRIEF DESCRIPTION OF THE DRAWINGS

A preferred embodiment, illustrative of the best mode in which applicant has comtemplated applying the principles, is set forth in the following description and is shown in the drawings and is particularly and distinctly pointed out and set forth in the appended claims.

FIG. 8 is an enlarged top plan view with portions broken away and in section, of the valve block portion of the improved spray device;

FIG. 9 is an enlarged fragmentary sectional view taken on line 9—9, FIG. 8;

FIG. 10 is a fragmentary sectional view taken on line 10—10, FIG. 9;

FIG. 11 is a fragmentary sectional view taken on line 11—11, FIG. 9; and

Similar numerals refer to similar parts throughout the drawings.

BEST MODE FOR CARRYING OUT THE INVENTION

Figure 1:
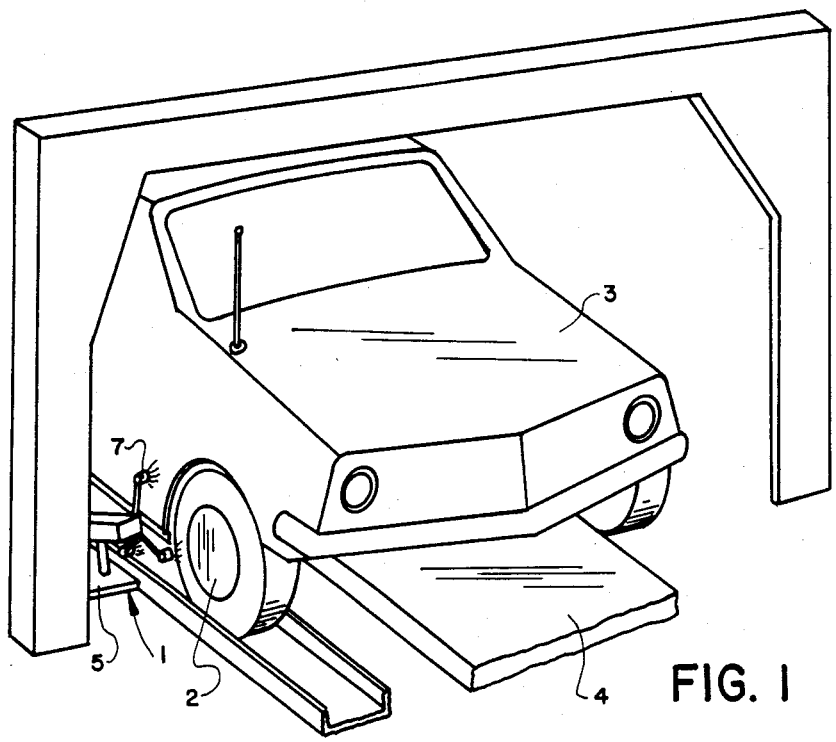
FIG. 1 is a fragmentary perspective view showing the improved rotary spray device in operation for cleaning the wheel of a vehicle.
Figure 2:
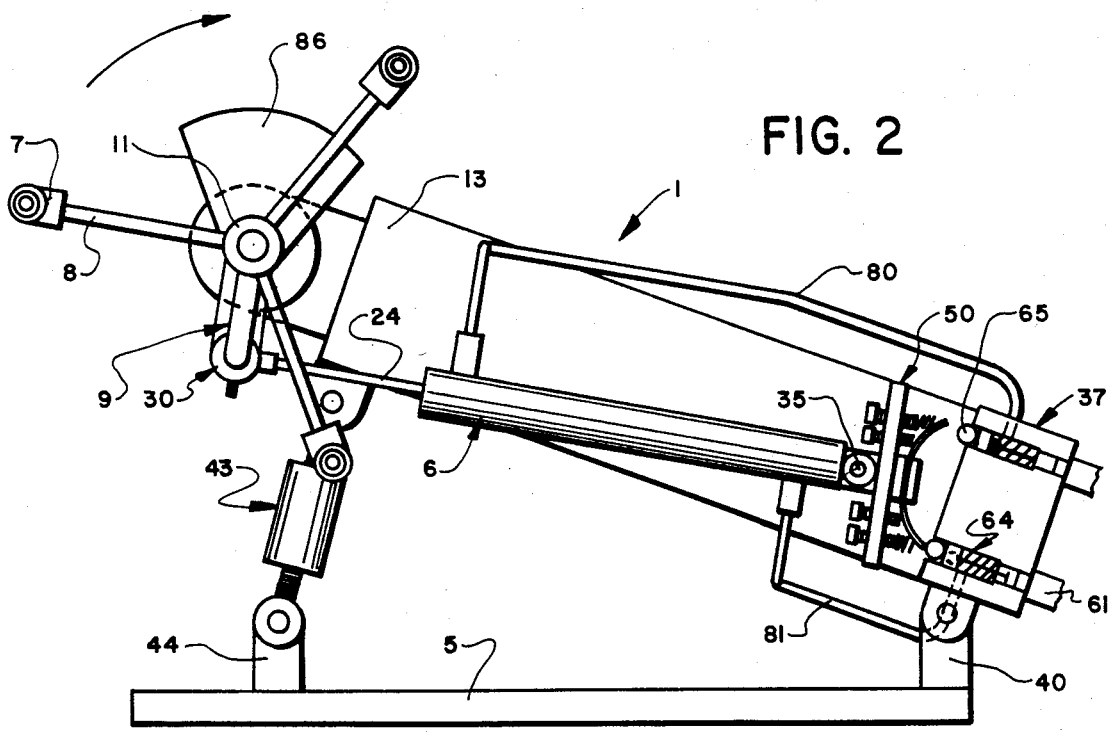
FIG. 2 is a side elevational view of the improved rotary spray device removed from the car wash installation of FIG. 1.

The improved rotary spray device is indicated generally at 1, and is shown in FIG. 1 spraying a wheel 2 of a vehicle 3. Although being shown for use in spraying vehicle wheels, device 1 will also spray the rocker panel of a vehicle due to its location as the vehicle moves past the spray device. Likewise, improved spray device 1 could be mounted at other positions in a car wash facility for spraying other portions of the vehicle without departing from the concept of the invention. Furthermore, device 1 can be used for other spray applications than in a car wash installation and be effective for applying a high pressure spray pattern of liquid or fluid against an object.

The spray device includes a base plate 5 which is adapted to be installed either in a fixed or moveable position along the path of a vehicle that is moved through a car wash installation by a conveyor 4. Plate 5 also can be mounted in a car wash facility of the type wherein the car maintains a fixed position in a wash bay and various other cleaning nozzles and brushes are moved around the stationary vehicle.

Figure 4:
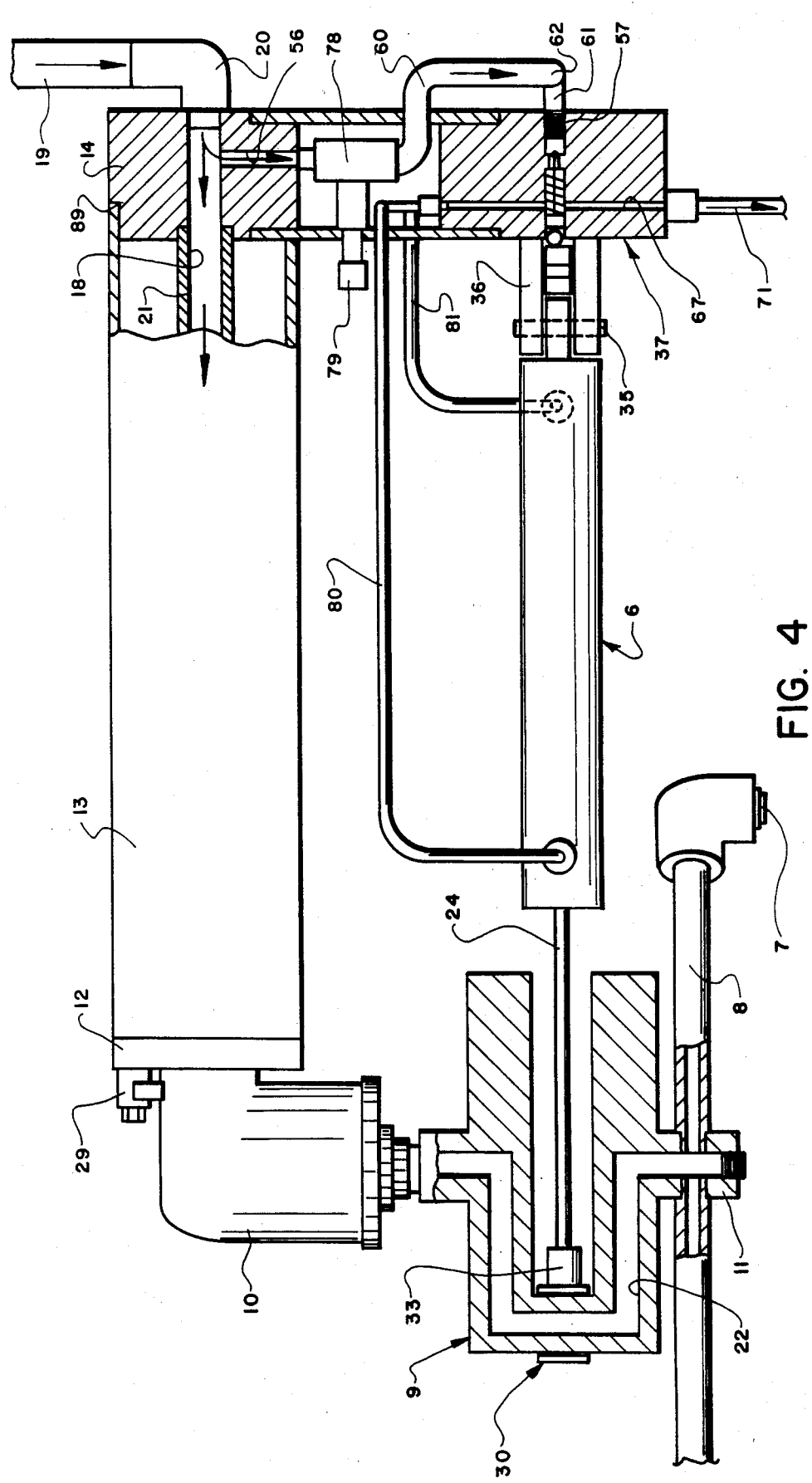
FIG. 4 is a fragmentary top plan view with portions broken away and in section, of the improved spray device.

Spray device 1 further includes a double-action piston indicated generally at 6, a plurality of spray nozzles 7 mounted on the extended ends of pipes or tubes 8 which extend radially outwardly from a hub 11 which is mounted on the end of a crankshaft indicated generally at 9 (FIG. 4). Crankshaft 9 is rotatably mounted at its other end on a rotary union 10 which is mounted by an end cap 12 on the outer end of a hollow support sleeve 13.

Figure 5:
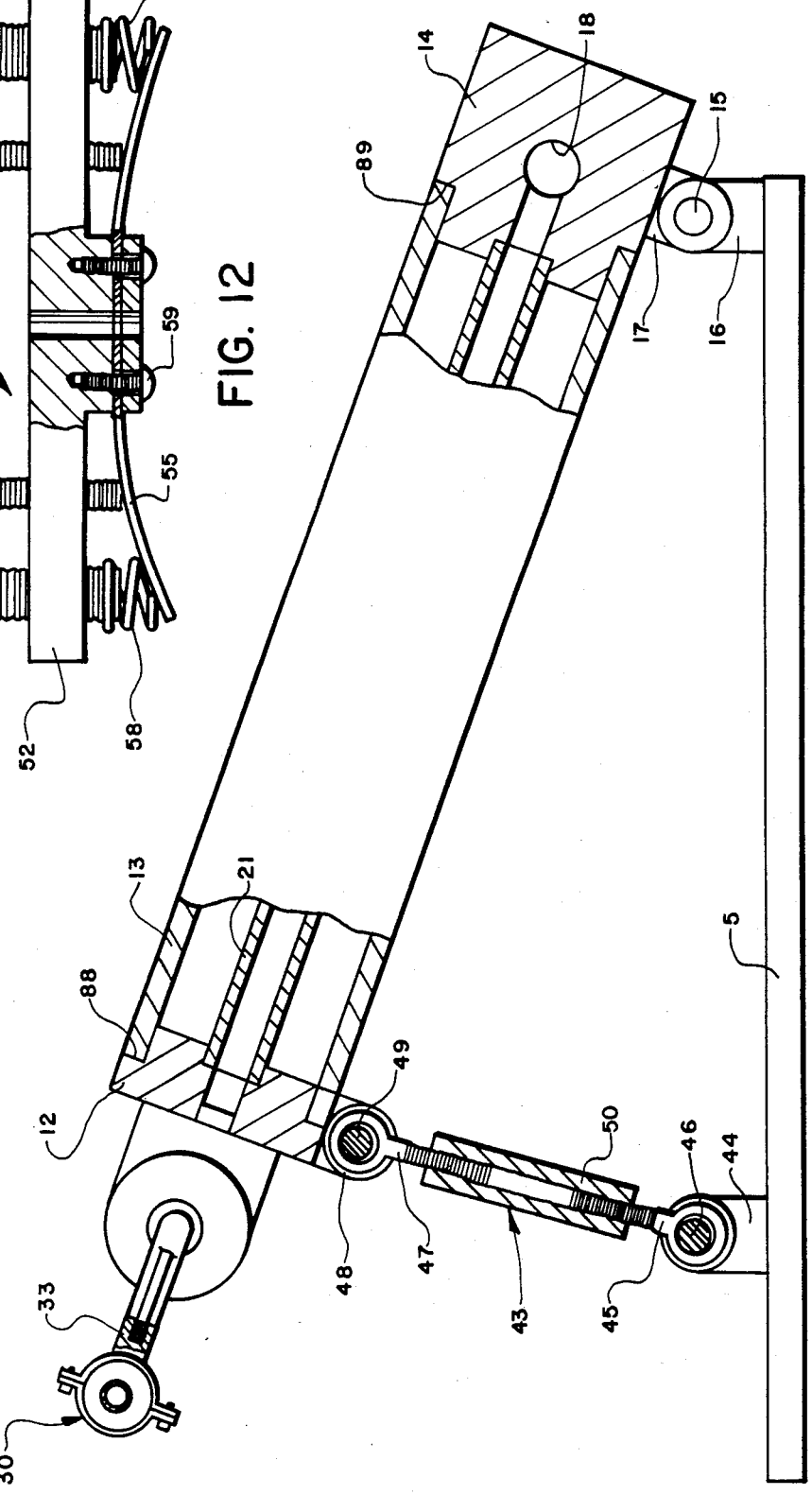
FIG. 5 is a fragmentary side elevational view with portions broken away and in section, of the fluid supply conduit portion of the improved spray device.

The other end of support sleeve 13 is mounted on a manifold 14 which is pivotally mounted by a pin 15 and a pair of spaced flanges 17 on an upstanding lug 16 formed on base plate 5 (FIG. 5). Manifold 14 is formed with a fluid passage 18 which is connected to a high pressure fluid supply line 19 by an elbow connector 20. A fluid supply pipe 21 is mounted on manifold 14 and communicates with fluid passage 18 and extends throughout the interior of support sleeve 13 and is connected to end cap 12 (FIG. 4).

Piston 6 (FIG. 3) includes a usual cylinder 23, a piston rod 24 having an enlarged piston head 25 complementary to and slidably mounted within interior 26 of cylinder 23. A pair of compression coil springs 27 and 28 are mounted within cylinder interior 26 and engage the end walls of the enclosed cylinder and rod head 25 to bias rod head 25 and connected rod 24 into a central intermediate position within the cylinder. The outer end of piston rod 24 is connected by a journal 30 to crankshaft 9. Journal 30 is of a usual construction consisting of a pair of semicircular sections 31 joined by bolts 32 to tightly clamp the journal on crankshaft 9. A lug 33 is formed on journal 30 and has a threaded opening for receiving the threaded end of piston rod 24 (FIG. 4).

Piston 6 is pivotally mounted on a valve block which is indicated generally at 37, by a pin 35 which extends between a pair of outwardly extending flanges 36 formed on the valve block 37. Another pair of spaced flanges 38 is formed on and project outwardly from valve block 37 for pivotally mounting the valve block on a lug 40 which extends upwardly from plate 5 by a pin 41 (FIGS. 3, 8, 9 and 10).

The vertical position or elevation of the spray nozzles is regulated by a turnbuckle assembly indicated generally at 43. Turnbuckle 43 includes a threaded eye bolt 45 which is pivotally mounted between a pair of plate flanges 44 by a pin 46. A second threaded eye bolt 47 is pivotally mounted between a pair of flanges 48 formed on end cap 12 by a pin 49. The shafts of eye bolts 45 and 47 are engaged within an internally threaded cylinder 50, the rotation of which provides for the vertical positioning of the spray nozzles.

Figure 3:
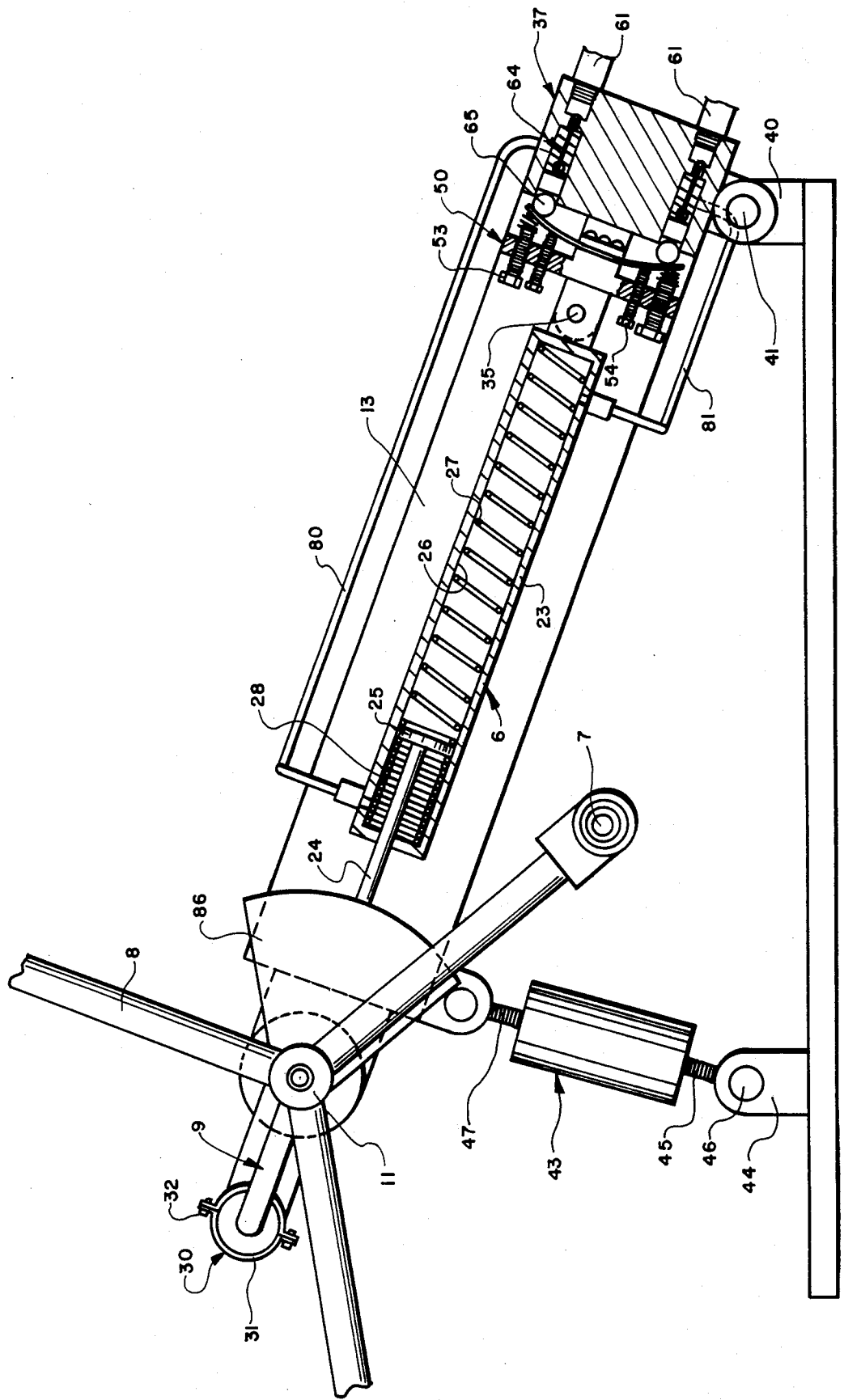
FIG. 3 is an enlarged fragmentary elevational view with portions broken away of the spray device of FIG. 2.
Figure 12:
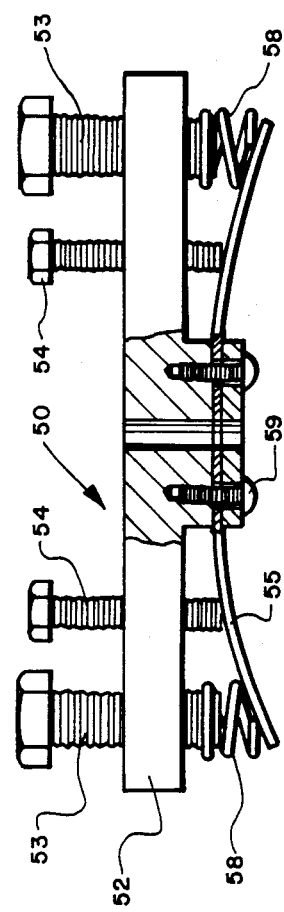
FIG. 12 is an enlarged elevational view with portions broken away of the rocker bar assembly removed from the spray device.

Referring to FIGS. 3, 9 and 12, a rocker bar assembly indicated generally at 50, is mounted by set screws 51 on the bottom of piston 6. Assembly 50 includes a rigid bar 52 having a first pair of bolts 53 threadably mounted within a pair of threaded holes formed in the outer ends of the bar, and a second pair of bolts 54 mounted in threaded holes located inwardly of bolts 53. A strip of spring steel 55 is attached to the center of bar 52 by screws 59 and extends beneath and coextensibly therewith and is adjusted with respect to bar 52 by bolts 54. The outer ends of spring strip 55 are biased into a bowed configuration by a pair of compression coil springs 58 mounted on the ends of bolts 53 and engaged with the ends of strip 55. In addition to outwardly projecting flanges 36 and 38, valve block 37 has a pair of fluid inlet passages 57 which are connected to an outlet passage 56 found in manifold 14 by a main conduit 60 (FIG. 4) and a pair of branch conduits 51 connected to conduit 60 by a Tee connection 62. Valve block 37 is shown in detail in FIGS. 8-11.

A pair of check valve assemblies indicated generally at 64, is mounted in block 37. Each assembly 64 includes valve ball 65 biased outwardly by a coil spring 66 which is engaged with a slide valve head 67 mounted on the end of a valve rod 69 which is located within a valve chamber 68. Each chamber 68 communicates with one of the inlet passages 57 through a fluid supply inlet port 63 which is opened and closed by a seal 72 mounted on the end of valve rod 69. An exhaust passage 70 communicates with each chamber 68 and is connected to a fluid exhaust line 71 (FIG. 4). Valve balls 65 are in the shape of spherical shells and are maintained within outer open ends of chambers 68 of valve block 37 by retaining pins 74. A pair of cylinder feed passages 77 are formed in valve block 37 and communicates with valve chambers 68 and are connected to cylinder 23 by flexible fluid supply lines 80 and 81.

Each valve ball 65 is biased by valve spring 66 into an outer closed position (FIG. 10) in which position valve rod seal 72 blocks the flow of fluid from inlet conduit 61 into valve chambers 68 through fluid inlet passage 57. In this position fluid is free to flow from cylinder 23 through lines 80 and 81 and into chamber 68 through passages 77 and then put of valve block 37 through exhaust passages 70. Exhaust passages 70 are connected by exhaust lines 71 to a drain, return storage tank or the like. When valve ball 65 is biased inwardly into chamber 68 by rocker bar 52 as described below, piston rod seal 72 is moved to an open position as shown in FIG. 11, in which position slide valve head 67 blocks the flow of fluid from chamber 68 into exhaust passages 70. However in this position feed passages 77 remain open with chamber 68.

A flow control block 78 is mounted in supply conduit 60 (FIG. 4) and has a control valve 79 which controls the amount of high pressure fluid passing through outlet passage 56 of manifold 14 and flowing into valve block 37 through conduit 60. Fluid lines 80 and 81 provide passages for injecting and removing fluid into and out of cylinder interior 26 for imparting reciprocating linear movement to piston rod 24 as described more fully below.

Figure 6:
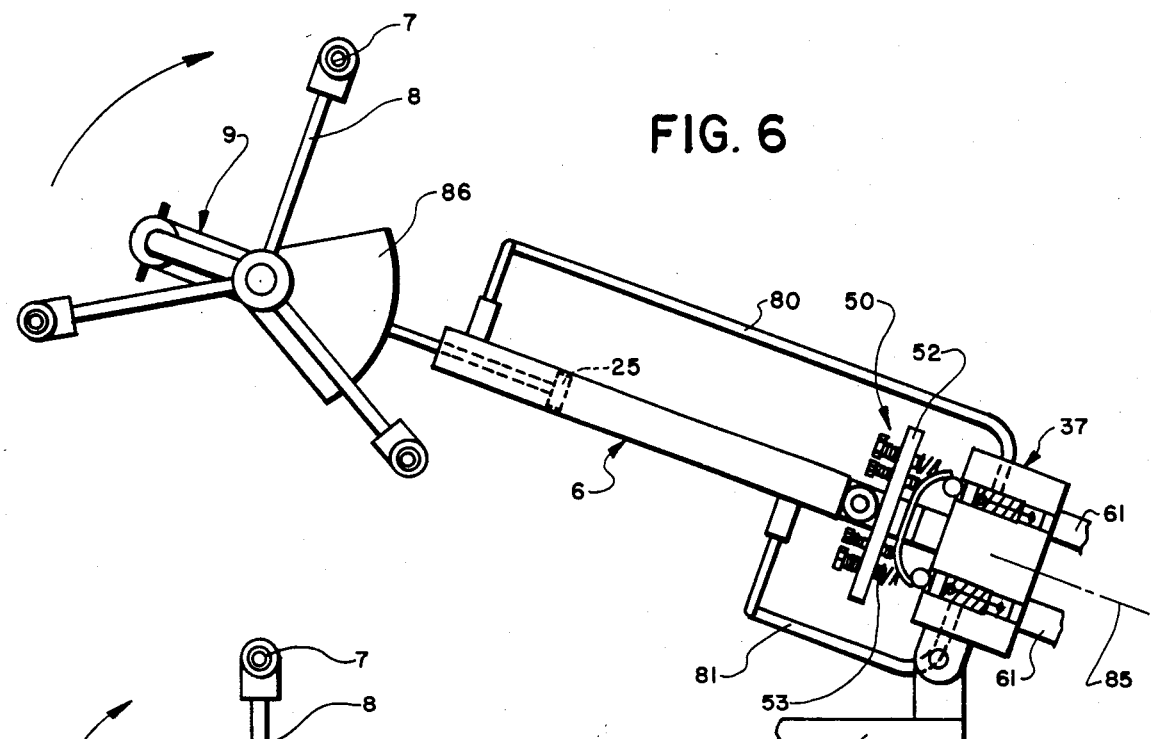
FIG. 6 is a diagrammatic view showing the position of the crankshaft when the piston rod is in a fully extended position.

Bolts 54 of rocker assembly 50 are adjusted to place spring strip 55 in a bowed position with bolts 53 being adjusted to bias the outer ends of strip 55 into contact with ball valves 65 as shown in FIG. 6 when cylinder 23 is in its neutral position. However, in this position strip 55 does not supply sufficient pressure to depress either of the valve balls and actuate their associated valve assemblies 64. However, once preset into this position even a slight movement of cylinder 23 from center line 85 will actuate one of the check valve assemblies starting the flow of high pressure fluid into the cylinder for actuation of piston rod 23. This adjustment eliminates a large null point or neutral position wherein both of the flow passages into the cylinder would be blocked momentarily which could result in a jerky or intermittent transmission of power to the piston. Thus, this precision setting of rocker assembly 50 with valve block 37 ensures a continuous uninterrupted linear movement of the piston rod and associated smooth rotary motion of crankshaft 9 and connected nozzles 7.

Also, delivery tube 21 need not be mounted within sleeve 13 as shown in the drawings. However, sleeve 13 provides rigidity to the spray device eliminating undue forces exerted on delivery pipe 21 and assists in reducing any rotation force component thereon. Preferably, sleeve 13 is secured by a connector 29 (FIG. 4) to rotary union 10 to further strengthen the mounting of sleeve 13 and its connection to end cap 12. Sleeve 13 preferably is mounted on end cap 12 and manifold 14 by a slip fit engagement in annular shoulders 88 and 89 formed respectively, thereon (FIGS. 4 and 5).

Figure 7:
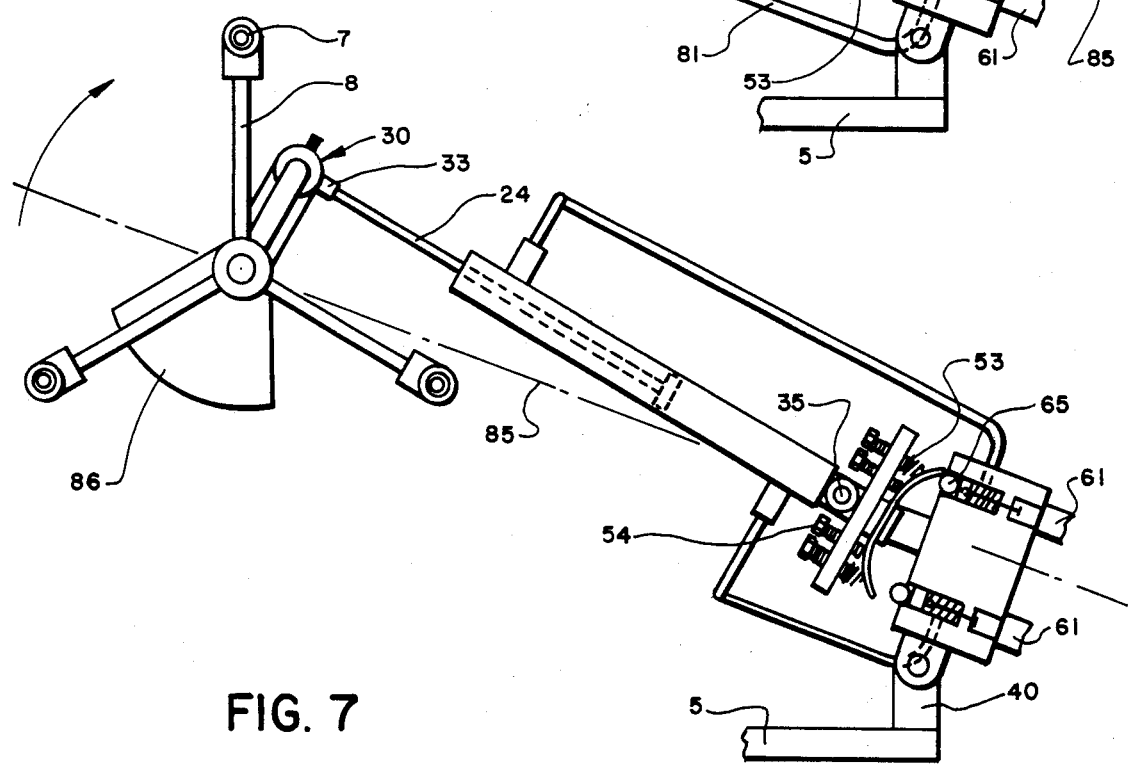
FIG. 7 is a diagrammatic view similar to FIG. 6 showing the position of the crankshaft when the piston rod is in a partially retracted position.

A brief description of the operation of improved rotary spray device 1 is set forth below. When in an at-rest position, cylinder springs 27 and 28 will maintain piston head 25 generally at the center of cylinder 23 as shown in FIG. 7. In this neutral position, piston cylinder 23 will be pivoted to one side of an imaginary centerline illustrated by line 85 (FIGS. 6 and 7) whereby one of the rocker assembly bolts 53 will depress its associated valve ball 65 overcoming the bias of valve spring 66 to move valve rod 67 to the position of FIG. 11 which will close the associated exhaust passage 70 while opening fluid inlet passage 57. A relatively small quantity of high pressure fluid will then flow from main inlet line 19 through manifold 14 and through supply line 81 into interior 26 of cylinder 23 forcing rod head 25 and rod 24 in an outward direction rotating nozzles 7 through crankshaft 9. When crankshaft 9 moves from the position of FIG. 7 to the fully extended piston rod position of FIG. 6, rocker bar assembly 50 will be in the neutral position, that is, bolts 53 will not actuate ball valves 65.

Crankshaft 9 includes a counterweight 86 which in addition to providing a smooth rotary motion to the crankshaft will enable the crankshaft to continue to rotate past the neutral position which will immediately pivot piston cylinder to the other side of centerline 85 whereby the opposite rocker arm bolt 53 will depress the other valve ball 65 permitting the fluid to flow from manifold 14 through valve chamber 68 and into the rod end of cylinder 23 through supply line 80 forcing rod head 25 and piston rod 24 in the retracted position within the cylinder interior continuing the rotation of the nozzles. When piston rod 24 reaches its fully retracted position crankshaft 9 and counterweight 86 will continue to rotate pivotally moving cylinder 23 to the other side of centerline 85 depressing the other valve ball repeating the same process.

Thus, the pivotal movement of cylinder 23 will alternatively depress valve balls 65 through rocker bar assembly 50 injecting and exhausting a small supply of the high pressure fluid diverted from manifold 14 into and out of the cylinder interior 26 to reciprocally linearly move piston rod 24 and rod head 25 within the cylinder to continuously rotate crankshaft 9 and connected nozzle hub 11 and nozzles 7. The linear reciprocating speed of piston rod 24 within cylinder 23 and consequently the rotational speed of nozzles 7, is controlled by control valve 79 which regulates the flow of high pressure fluid from manifold 14 through conduit 60 and into valve block 37. Control valve 79 enables the rotational speed of the nozzles to be accurately controlled by an easy manual manipulation of the control valve.

Upon the stoppage of the high pressure fluid from flowing to the nozzles through main supply conduit 19 by a shutoff valve (not shown) rod head 25 and rod 24 will return to the intermediate neutral position as shown in FIG. 7 by the action of coil springs 27 and 28. In this position, the cylinder is pivoted off center so that one of the ball check valves is actuated by rocker arm bolt 53 whereby immediately upon the opening of a main flow valve the small quantity of diverted fluid from manifold 14 into valve block 37 will immediately flow through the depressed valve and through the associated valve chamber 68 and supply line 80 or 81 and into cylinder interior 26 for starting the linear movement of the piston rod and consequently the rotational motion of the spray nozzles.

Spring strip 55 will be adjusted by bolts 54 so that bolts 53 through coil springs 58 will exert sufficient pressure on the associated ball valve 65 whereby only a slight movement of cylinder 23 beyond the centerline position will exert sufficient force to actuate the ball valve permitting the flow of fluid through the valve chamber and into the cylinder to start the reciprocal motion of the piston rod.

In accordance with one of the main features of the invention, only a very small quantity of high pressure fluid need be diverted from the main fluid supply into control block 37 for actuating piston rod 24 to achieve the linear reciprocating motion thereof, and correspondingly the rotation of nozzles 7. Nearly all of the incoming high pressure fluid is fed to nozzles 7 through delivery pipe 21 and through the hollow interior 22 of crankshaft 9 and into hub 11 for distribution through pipes 8 to nozzles 7. The spray from nozzles 7 preferably is directed generally perpendicularly against a surface being cleaned so that the entire force of the high pressure fluid is impinged against the surface. This is in contrast to other rotary spray devices which position the nozzles at an angular relationship to the surface being cleaned and to the rotational axis of the nozzles to generate a directional force component for rotating the nozzles which reduces considerably the impingement force of the spray on the surface being cleaned.

Although the improved rotary spray device described above shows a double action cylinder in which fluid is supplied into the cylinder for both extending and retracting the piston rod, a single action cylinder would work by use of a single spring located within the cylinder. This single spring in combination with a single fluid inlet port would provide the desired reciprocal movement of the piston. However, it is believed that the double action cylinder shown and described provides the most satisfactory results and smoothness of operation.

Likewise, although crankshaft 9 is shown as the mechanism for transforming the reciprocal motion of the piston rod into the rotary motion to the nozzles, other types of eccentric means could be used to provide the same effect without departing from the concept of the invention. Furthermore, it is desirable that the nozzles emit their fluid spray generally perpendicularly against the surface being cleaned, or parallel to their axis of rotation to achieve the most efficient cleaning result. If desired, for certain applications the angle of spray can be modified from the perpendicular direction without affecting the concept of the invention. However the perpendicular spray direction is preferred in order to achieve the full impact of the high pressure liqiud spray. This high pressure for a usual car wash installation will be approximately 800 psi.

Accordingly, the improved rotary spray device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved rotary spray device is constructed and used, the characteristics of the construction, and the advantageous, new and useful results obtained; the new and useful structures, devices, elements, arrangements, parts, and combinations, are set forth in the appended claims.

What is claimed is:

1. A rotary spray device including:
 (a) nozzle means for spraying a fluid in a generally perpendicular direction against a surface to be cleaned;
 (b) conduit means adapted to be connected to a source of high pressure fluid for supplying the fluid to the nozzle means;
 (c) eccentric means connected to the nozzle means for rotating said nozzle means upon rotation of said eccentric means;
 (d) piston means having a piston rod connected to the eccentric means for rotating the eccentric means upon linear movement of the piston rod; and
 (e) valve means communicating with the piston means and source of high pressure fluid for selectivity injecting a predetermined quantity of the high pressure fluid into the piston means to reciprocate the piston rod and rotate the nozzle means through the eccentric means, said valve means including a valve block connected to the source of high pressure fluid and a pair of valves; and in which the piston means includes a cylinder which is pivotally mounted on the valve block and actuates the valves upon pivotal movement of the cylinder.

2. The rotary spray device defined in claim 1 in which the eccentric means is a crankshaft.

3. The rotary spray nozzle defined in claim 2 in which a counterweight is mounted on the crankshaft.

4. The rotary spray device defined in claim 3 in which the valve means further includes rocker bar means actuated by the pivotal movement of the cylinder for actuating the check valves to inject high pressure fluid into the cylinder for reciprocally moving the piston rod within said cylinder to rotate the nozzle means through the eccentric means.

5. The rotary spray nozzle defined in claim 4 in which the rocker bar means is connected to the cylinder of the piston means; and in which the rocker bar means has a pair of ends which alternatively engage each of the valves for opening and closing said valves in response to the pivotal position of the cylinder.

6. The rotary spray nozzle defined in claim 5 in which the valves are normally closed blocking the flow of high pressure fluid into the cylinder and include spring biased valve balls and valve rods; and in which the valve rods are moved alternatively into open position upon contact of the valve balls with a respective end of the rocker bar means permitting flow of the fluid into the cylinder.

7. The rotary spray device defined in claim 6 in which the rocker bar means includes a rocker bar which is attached to the cylinder for rocking movement in relationship to the pivotal movement of the cylinder, and a spring steel strip mounted on and extending generally coextensive with said rocker bar; and in which a pair of coil springs is mounted between the rocker bar and spring strip to bias outer ends of the spring strip into engagement with the valve balls.

8. The rotary spray nozzle defined in claim 1 including base plate means for supporting the nozzle means and piston means adjacent a surface to be sprayed by the nozzle.

9. The rotary spray nozzle defined in claim 8 in which the base plate means includes a base plate and an adjustable link extending between the base plate and conduit means for adjusting the position of the nozzle means with respect to the base plate.

10. The rotary spray nozzle defined in claim 9 in which the adjustable link is a turnbuckle.

11. The rotary spray device defined in claim 1 in which the conduit means including a supply pipe adapted to be connected to the source of high pressure fluid; and in which a rotary union connects the supply pipe to the eccentric means.

12. The rotary spray device defined in claim 11 in which the supply pipe is mounted within an outer sleeve which extends between the rotary union and a manifold; and in which the manifold is connected to the source of high pressure fluid and directs the predetermined quantity of high pressure fluid to the valve means for controlling the movement of the piston rod.

13. A rotary spray device including
 (a) nozzle means for spraying a fluid in a generally perpendicular direction against a surface to be cleaned;
 (b) conduit means adapted to be connected to a source of high pressure fluid for supplying the fluid to the nozzle means;
 (c) eccentric means connected to the nozzle means for rotating said nozzle means upon rotation of said eccentric means;
 (d) piston means having a piston rod connected to the eccentric means for rotating the eccentric means upon linear movement of the piston rod; and
 (e) valve means communicating with the piston means and source of high pressure fluid for selectivity injecting a predetermined quantity of the high pressure fluid into the piston means to reciprocate the piston rod and rotate the nozzle means through the eccentric means, said eccentric means being a crankshaft. said crankshaft being hollow and providing a path for the flow of high pressure fluid from the conduit means to the nozzle means.

14. The rotary spray device defined in claim 13 in which the nozzle means includes a plurality of spray nozzles mounted on the ends of fluid supply pipes extending radially outwardly from a hub; and in which the hub is connected to the crankshaft.

15. A rotary spray device including:
 (a) nozzle means for spraying a high pressure fluid against a surface to be cleaned;
 (b) conduit means adapted to be connected to a source of high pressure fluid and communicating with the nozzle means for supplying said fluid to the nozzle means;
 (c) eccentric means rotatably mounted on the conduit means and connected to the nozzle means for rotating said nozzle means upon rotation of said eccentric means;
 (d) piston means connected to the eccentric means for rotating the eccentric means upon linear movement of the piston means; and
 (e) valve means communicating with the piston means and the source of high pressure fluid for selectiveity injecting a small predetermined quantity of the high pressure fluid into the piston means to reciprocate said piston means and rotate the nozzle means through the eccentric means, wherein said valve means includes a valve block connected to the source of high pressure fluid and a pair of valves; and in which the piston means includes a cylinder which is pivotally mounted on the valve block and actuates the valves upon pivotal movement of the cylinder.

* * * * *